(12) United States Patent
Shepheard

(10) Patent No.: US 6,663,812 B1
(45) Date of Patent: Dec. 16, 2003

(54) METHOD FOR MOULDING A COMPONENT FOR DESIGN VERIFICATION

(76) Inventor: Paul Anthony Shepheard, c/o Swift Technologies Limited 140-144 Station Road, March, Cambridgeshire PE 15 8NH (GB)

( * ) Notice: Subject to any disclaimer, the term of this patent is extended or adjusted under 35 U.S.C. 154(b) by 0 days.

(21) Appl. No.: 09/601,056

(22) PCT Filed: Nov. 25, 1999

(86) PCT No.: PCT/GB99/03934

§ 371 (c)(1),
(2), (4) Date: Jul. 24, 2000

(87) PCT Pub. No.: WO00/30784

PCT Pub. Date: Jun. 2, 2000

(30) Foreign Application Priority Data

Nov. 26, 1998 (GB) ............................................. 9825952
Sep. 16, 1999 (GB) ............................................. 9921942

(51) Int. Cl.[7] .............................................. B29C 33/40
(52) U.S. Cl. ....................... 264/225; 249/134; 264/220; 264/328.1
(58) Field of Search ................................ 264/220, 225, 264/328.1; 249/134

(56) References Cited

U.S. PATENT DOCUMENTS

| 4,072,673 | A | * | 2/1978 | Lammers | ..................... 264/225 |
| 4,466,936 | A | * | 8/1984 | Schapel | ........................ 264/225 |
| 5,569,419 | A | * | 10/1996 | Brenot et al. | ................ 264/225 |
| 6,342,178 | B1 | * | 1/2002 | Matsuoka et al. | .......... 264/225 |

FOREIGN PATENT DOCUMENTS

| FR | 985995 | 3/1951 |
| FR | 2314802 | 1/1977 |

* cited by examiner

Primary Examiner—Allan R. Kuhns
(74) Attorney, Agent, or Firm—Cesari and McKenna, LLP

(57) ABSTRACT

The invention relates to a method and system for producing verified component designs and for assisting in tool design to near-production specification in the materials of choice, via production processes and in considerably shorter time scales than has previously been possible. The method comprises the steps of: (a) pouring a mould matrix material around a pattern of the article to be produced in a mould bounded by solid, inflexible retaining means; (b) causing said mould matrix material to harden to produce a flexible moulding medium; (c) removing the pattern from the flexible moulding medium to leave a mould cavity conforming to the profile of the pattern; (d) forming or moulding an article in the mould cavity under production-representative conditions of temperature and pressure, and (e) removing the article from the mould cavity; characterised in that said flexible moulding medium produced in step (b) above by causing said mould matrix material to harden having the following physical properties: flexural strength in the range 20–300 MPa; flexural modulus in the range 700–10,000 MPa; tensile strength in the range 16–200 MPa; tensile modulus in the range 850–10,000 MPa; compressive strength in the range 24–500 MPa; compressive modulus in the range 400–10,000 MPa; hardness in the range 5–100 Vickers; and relative density in the range –10 g/cm$^3$.

27 Claims, 3 Drawing Sheets

METHOD FOR MOULDING A COMPONENT FOR DESIGN VERIFICATION

The present invention relates to component design and, in particular, to a method and system for producing verified component designs and to assist in tool design to near-production specification in the materials of choice, via production processes and in considerably shorter time scales than has previously been possible.

Traditionally, pattern makers and tool makers have undertaken key roles in bringing new component designs through design evaluation, development and modification to production standards. Until comparatively recently, such work was labour-intensive, time consuming and, as a result, costly. More recently, computer aided design has enabled some of the early evaluation steps to be carried out before a new design is reduced to a 3-D prototype. Nevertheless, a point is inevitably reached during design evaluation when a 3-D prototype of the new design is required.

So-called "rapid prototyping" techniques have been developed which enable designs to be produced in 3-D form using a variety of techniques now well established in the art. Such rapid prototyping methods allow compression of timescale in the production of a component master pattern.

The drawback of current rapid prototyping methods is that the 3-D representation which results is not necessarily made from the production material of choice and, in any case, is not made via a production process. For example, one known rapid prototyping method is so-called "laminated object manufacturing" in which the computer design is recreated in 3-D form as a multiplicity of laminated layers. A component master pattern is produced in a material, such as paper, which is easily laid down as thin layers bonded together. However, some form of tool then needs to be made to produce a mould for replicating the design in the correct material using a production process. The rapidly-produced prototype or simulant material part is only of limited use in the evaluation process because the material from which it has been produced and/or the method by which it has been produced are not the same as the material and/or method that will be used in full scale production.

Despite its limitations, if evaluation of the rapidly-produced prototype is favourable, the conventional methods of producing a mould tool, using traditional tool room methods or, alternatively, using sintered or resin based materials, must then be employed to take the verification process forward. As discussed above, these known methods are costly and time-consuming to implement, and have their own particular limitations regarding parameters such as temperature, geometry, pressure and surface finish.

It is also true that the time and cost penalties of changing component design and hence tooling when modifications are required will influence the majority of designers to follow a well-defined, minimal risk path based on their experience. This means that they tend to be inhibited about deviating from conventional techniques.

What is therefore needed is an intermediate verification step which enables a quickly-produced component to be obtained from a master pattern, in the material of the designer's choice and using a production process. Preferably, this design verification step should be carried out as early as possible during the design process, for example at the concept stage or as soon as a master pattern can be made.

It is therefore an object of the present invention to provide a method of producing designs in the material of choice with relative ease, relatively quickly and cost effectively compared to conventional methods. It is another object of the invention to provide a method of producing designs via a production process. It is a further object of the invention to enable verification of component design to be carried out prior to commitment to high cost tooling upon finalisation of a design. It is a still further object of the invention to provide a process which enables design iteration to be carried out relatively easily and cheaply, thereby giving both engineers and designers greater design freedom before commitment and with a hitherto unattainable degree of confidence that the resulting production parts will satisfy the design criteria.

The invention is a method of producing an article in a mould cavity formed by casting around a pattern of the article to be produced, the method comprising:

(a) pouring a mould matrix material around said pattern in a mould bounded by solid retaining means;

(b) causing said mould matrix material to harden to produce a flexible moulding medium having the following physical properties:
flexural strength in the range 20–300 MPa;
flexural modulus in the range 700–10,000 MPa;
tensile strength in the range 16–200 MPa;
tensile modulus in the range 850–10,000 MPa;
compressive strength in the range 24–500 MPa;
compressive modulus in the range 400–10,000 MPa;
hardness in the range 5–100 Vickers; and
relative density in the range 1–10

(c) removing the pattern from the flexible moulding medium to leave a mould cavity conforming to the profile of the pattern;

(d) forming or moulding an article in the mould cavity under production-representative conditions of temperature and pressure, and (e) removing the article from the mould cavity.

Advantageously the flexible moulding medium has a flexural strength in the range 30 to 100 MPa and preferably around 40 MPa.

Advantageously, the flexible moulding medium has a flexural modulus in the range 1000 to 4000 MPa and preferably around 1500 MPa.

Advantageously, the flexible moulding medium has a tensile strength in the range 20 to 70 MPa and preferably around 22 MPa.

Advantageously, the flexible moulding medium has a tensile modulus in the range 1000 to 4000 MPa and preferably around 1300 MPa.

Advantageously, the flexible moulding medium has a compressive strength in the range 30 to 120 MPa and preferably around 40 MPa.

Advantageously, the flexible moulding medium has a compressive modulus in the range 600 to 2000 MPa and preferably around 1000 MPa.

Advantageously, the flexible moulding medium has a hardness in the range 7 to 80 Vickers and preferably around 9.5 Vickers.

Advantageously, the flexible moulding medium has a density in the range 1.2 to 5 and preferably around 1.3.

Preferably, the pourable material is a curable resin such as a urethane polymer cured by incubation for a short spell (about one hour) at room temperature in the presence of an isocyanate cross-linking agent. Most preferably, the pourable material is a polyester-based polyurethane.

The pourable material may be loaded with a variety of fillers to regulate the properties of the hardened material which forms the flexible mould. For example, the pourable material may include suspended particulate metal to improve the heat transfer characteristics of the cured mould. Alternatively, a material, such as glass or ceramic beads, could be added to impart better insulation capacity. Similarly, additives can be incorporated to influence hardness, rigidity, toughness, operating temperature range and such like in the cured mould.

The exact nature of the physical additives will vary according to the particular additive material in question. For example, in the case of particulate metal additives, the buoyancy of the additive particles relative to the matrix material must be taken into consideration. A buoyancy approaching neutrality is best, otherwise there may occur marked settlement of the added particulate material during hardening or cure of the matrix material. A certain degree of settlement is permissible and may even be desirable, for example in the preparation of a mould which needs to have its thermal conductivity boosted for moulding hot materials. If metal particles gravitate towards the split line during mould cure, thermal conductivity enhancement is greatest in the portion of the mould immediately surrounding the mould cavity. This makes the mould more tolerant of hot moulded product.

Generally, the fillers or additives are included in an amount ranging from 30 to 70% in proportions by volume measured relative to the total volume of mould matrix material. At proportions below 30% by volume, the additives tend to lose their effectiveness and the mould might as well be formed using undiluted matrix material. At proportions greater than 70% by volume, the additives tend to dominate the physical properties of the mould matrix material and some of the advantages of using a dynamic material are lost. In particular, the bond lengths formed in the cured material are relatively shorter and the cured matrix material therefore loses some of its rubber-like qualities. Also, the higher the filler content, the more difficult the material becomes to handle in its uncured state. For example, high filler contents mean that the material may be unsuitable for manual mixing.

Preferably, the additives are included in an amount ranging from 40 to 60% in proportions by volume, more particularly in an amount ranging from 45 to 55% by volume, especially 50% by volume.

Typical non-conductive additives include talc, Molochite (Registered trade mark)—an alumino-silicate refractory material proprietary to English China Clay International, and glass. Typical particle sizes are 200 microns and below, and it will be understood by persons skilled in the art that additive particles should have an even granule size to encourage homogeneity in the mould during curing.

One of the primary functions of the filler material is to combat shrinkage in the mould matrix material as it cools. It is important that the cured mould matrix material is thermally stable in the sense that it has dimensional stability over its working temperature range. Typically, the unhardened mould material is capable of being poured over a temperature range of 0° C. to 200° C. and, once hardened, is able to accept a working range of moulding materials having melt flow temperatures varying between −40° C. and 600° C. At the upper limit of this working range, it is important to minimise the length of time for which the mould matrix material is exposed to elevated temperature, otherwise the mould matrix material may become permanently degraded to the detriment of moulding fidelity in the finished component. Therefore, it is advisable in such circumstances to load the mould matrix material with a conductive filler, such as steel particles, to distribute the thermal energy of the moulding material quickly through the matrix material.

Mild steel particles may be used as a filler for non-corrosive moulding materials, but stainless steel particles are preferred if the moulding material is in any way corrosive. For example, many rubber compositions include a high sulphur content which renders them highly corrosive. Stainless steel particles would therefore be recommended for moulding components from rubbers.

Fibre fillers could also be used, but these cause a marked increase in viscosity in the unhardened mould matrix material. As a result, the unhardened material may become unworkable manually, requiring mechanical mixing apparatus. Also, the pouring properties are altered, so it becomes vital to optimise the rate of hardening after pouring to ensure that the mould matrix material assumes the desired form around the component master pattern before hardening is complete.

Besides fillers, which alter mould properties by physical means, it is also possible to influence the properties of the cured mould by chemical means, by varying the chemical formulation, such as changing the nature of the pre-polymer or using a different blend of starting materials.

It is a key feature of the hardened mould matrix material that it possesses an elastic memory over the quoted operating temperature range. The elastic memory is defined at the time the material is poured against the pattern and caused to harden—this sets the memory to the shape of the component master pattern. When the mould form is distorted during the moulding process, for example as a result of the applied injection pressure, it has dynamic power to return to its original shape when the applied pressures in the mould are released.

It can be seen from the foregoing that it is relatively easy to change the flexible medium to suit particular criteria and, in particular, to match the moulding requirements of a particular end product.

One of the key advantages of using a pourable material to form the mould cavity around a component master pattern is that the features of the pattern are faithfully reproduced, including surface finishes. Moreover, the flexible nature of the cured mould means that undercut formations on the component master pattern are not problematic: the pattern can be jumped from the cured mould with relative ease and the mould reverts to its unstressed form by virtue of its resilience. The same is true for moulded articles subsequently formed in the mould cavity vacated by the component master pattern.

It is also a clear advantage of the present invention that mould formation is so quick and faithful to the prototype, compared to conventional tool making methods, because minor changes to the tool configuration can be accommodated quickly and cheaply. Faithful reproduction of the component master pattern in the cured mould means that draft angles and fillets do not have to be incorporated at every stage, but can be introduced later during the design evaluation process when the exact fillet and draft angle requirements become fully evident.

Another advantage of the present invention is that it can be regulated to give flash-free moulding. In a conventional mould, the applied pressure acts only along the axis of the mould parts and there is a tendency for the material that is being moulded to creep along any lines of weakness, such as along the split lines which are generally oriented perpendicularly to the mould pressing axis. Increasing the moulding pressure may exaggerate the creep problem and it is therefore an acquired skill to judge what moulding conditions will be best for a particular product and/or material to minimise flash yet achieve good product integrity, using conventional moulding techniques.

By contrast, the cured mould material used in the present invention is a flexible form which is capable of exerting equal pressures around the entire orientation of the mould cavity. Hence, an increase in the injection pressure is transmitted into the body of mould matrix material and results in an increase in the mating forces experienced between the mould halves at the split lines. Creep is thereby inhibited and flash-free products result. This is only possible because the mould matrix material is a dynamic material and remains flexible under the moulding pressures applied in the inventive process.

Persons skilled in the art will recognise that, in conventional moulding technology, increasing the injection pressure is likely to cause separation between the mould halves and increase the incidence of flash. The present invention therefore operates in completely the opposite sense from prior art teaching.

Other advantages and modifications of the invention will be apparent to persons skilled in the art from the present description.

BRIEF DESCRIPTION OF THE DRAWINGS

The invention will now be described by way of example only with reference to the drawings, in which.

DETAILED DESCRIPTION OF THE INVENTION

Figure 1:
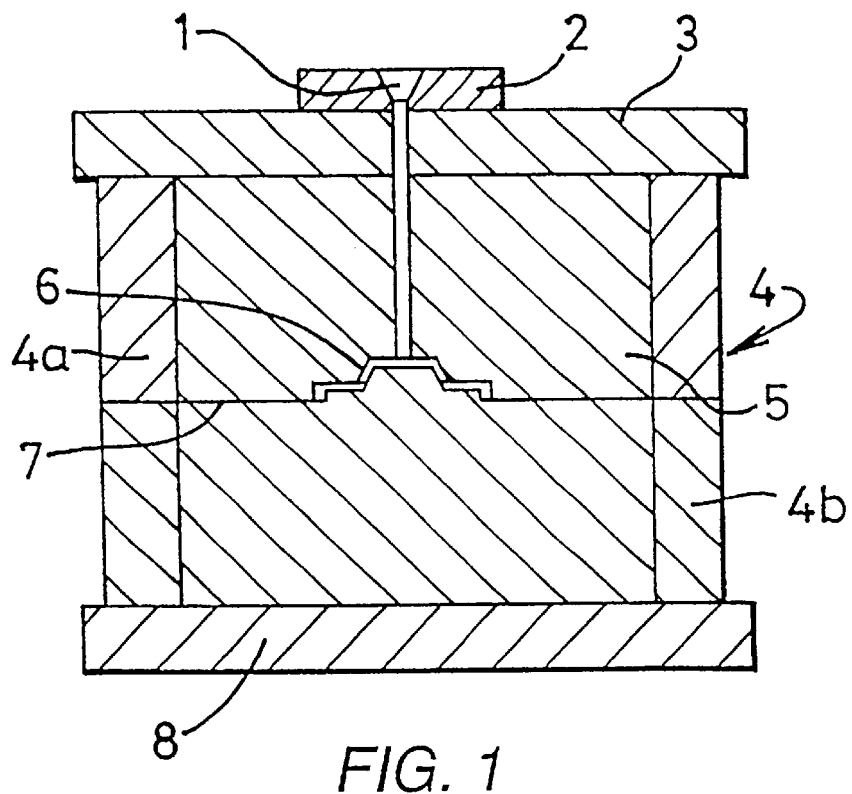
FIG. 1 is a schematic cross-sectional view of an assembled mould showing a mould cavity destined to be filled with moulding material.
Figure 2:
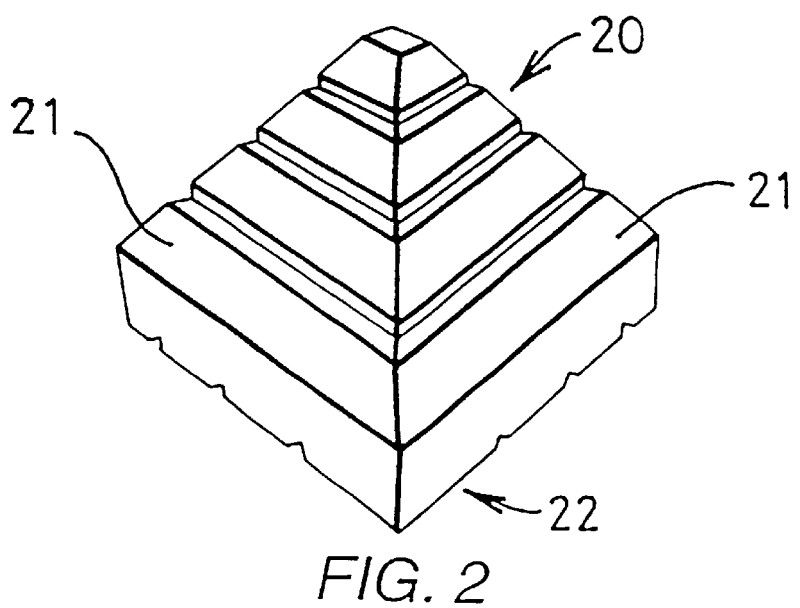
FIG. 2 is a schematic perspective view of a three-dimensional pattern.

Referring now to FIG. 1, an assembled mould is shown comprising steel retaining walls 4 defining upper and lower bolster members 4a, 4b. The upper bolster member 4a is bounded on its upper surface by a top plate 3 and the lower bolster member 4b is bounded on its lower surface by a bottom plate 8. The bottom plate 8 forms the base of a rigid container and is adapted to be fastened to the lower platen of a production moulding machine (not shown).

The chamber defined by the retaining walls 4 and top and bottom plates 3, 8 is largely filled with a flexible medium 5 comprising a multi-component polymeric material such as a loaded polyurethane resin. As discussed above, the flexible medium 5 may contain a variety of additives to influence its properties according to the nature of the product that is being moulded.

The flexible medium 5 bounded by the upper bolster member 4a includes a channel extending from the exterior of the chamber, through the top plate 3, to a mould cavity 6. Mould cavity 6 will previously have been formed around a component master pattern in a manner to be described in more detail below. On the upper surface of top plate 3 there is provided an injection point 1 surrounded by a register ring 2 which serves to locate the mould assembly relative to an injection nozzle of a production moulding machine (not shown).

Split line 7 indicates the interface between the tool components. At the end of a moulding operation, the mould may be separated at this interface and the moulded component removed. The mould can then be reassembled and is ready for re-use.

The effectiveness of the mould in producing products which are accurate copies of masters is dependent on the physical properties of the flexible medium 5 being correctly selected.

The most important physical properties are flexural strength and modulus, tensile strength and modulus, compressive strength and modulus and hardness and density of the flexible medium.

Table 1 shows values and ranges for these physical properties.

In Table 1 three separate sets of physical properties are set out. The first broad range is the range within which the invention can be carried out, the second intermediate range which sets sub-ranges which will normally provide better results and a third set of preferred values which will normally provide the best results.

|  | Broad | Intermediate | Preferred |
|---|---|---|---|
| Flexural Strength | 20–300 MPa | 30–100 MPa | 40 MPa |
| Flexural Modulus | 700–10000 MPa | 1000–4000 MPa | 1500 MPa |
| Tensile Strength | 16–200 MPa | 20–70 MPa | 22 MPa |
| Tensile Modulus | 850–10000 MPa | 1000–4000 MPa | 1300 MPa |
| Compressive Strength | 24–500 MPa | 30–120 MPa | 40 MPa |
| Compressive Modulus | 400–10000 MPa | 600–2000 MPa | 1000 MPa |
| Hardness | 5–100 Vickers | 7–80 Vickers | 9.5 Vickers |
| Density | 1.0–10.0 | 1.2–5.0 | 1.3 |

In practice of course it is not always possible to employ a flexible medium having physical properties about the preferred values or sometimes even within the intermediate advantageous ranges of values because of other criteria on which the selection of the flexible medium 5 must be made. Typically, such criteria can include cost or limitations imposed by the process by which the flexible medium 5 is formed. For example, where the flexible material 5 is produced by pouring a curable resin around a master the pourable resin must be compatible with the material of the master and will have limitations on its properties imposed by the requirements of the pouring process.

In general, it has been found that provided the physical properties of the flexible medium are within the first broad range in Table 1 acceptable results can be obtained although normally the results obtained will improve as more of the physical properties are brought within the second intermediate range and as close as possible to the preferred values.

Turning now to FIGS. 2 to 5, FIG. 2 is a schematic perspective view of a three-dimensional master pattern 20 which it is intended to reproduce in the material of the designer's choice for design verification purposes. Master pattern 20 has four stepped sloping sides 21 and a profiled base 22.

Figure 3:
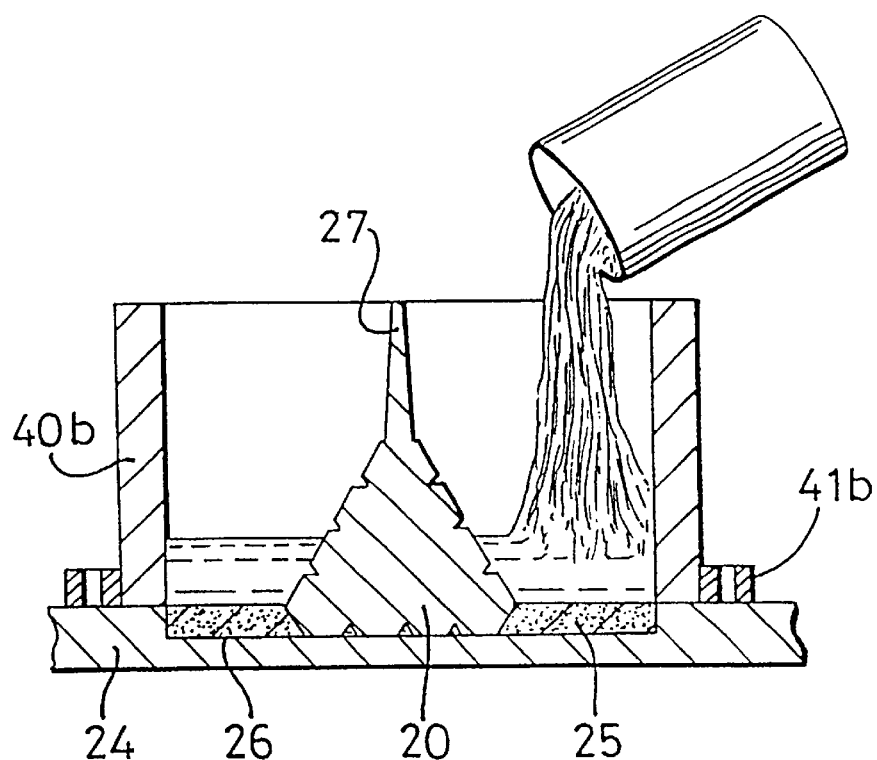
FIG. 3 is schematic cross-sectional view depicting an early stage in the process of the present invention.

FIG. 3 shows in schematic cross-sectional view an early stage in mould preparation. Master pattern 20 has been positioned in a bed of dry particulate material 25, such as sand, the depth of which determines the relative position of the split line in the completed mould, as will become apparent from the description which follows. For convenience, the dry particulate material 25 and the master pattern 20 are stood in a preparation tray 24 having a shallow well 26. The well 26 is surrounded by lower bolster member 40b, inverted so that master pattern base 22 is adjacent the rim 41b of the lower bolster member 40b which will form an interface with the upper bolster member 40a when the mould is fully assembled.

A sprue pattern 27 is attached to the apex of the master pattern 20 and then the first half of the pourable mould material is poured into the space defined by the walls of the lower bolster member 40b. The pourable mould material will have been pre-mixed with a curative that results in hardening to a solid flexible material. The first section of the mould is then allowed to stand, for example for one hour at room temperature, until the mould material has cured.

Figure 4:
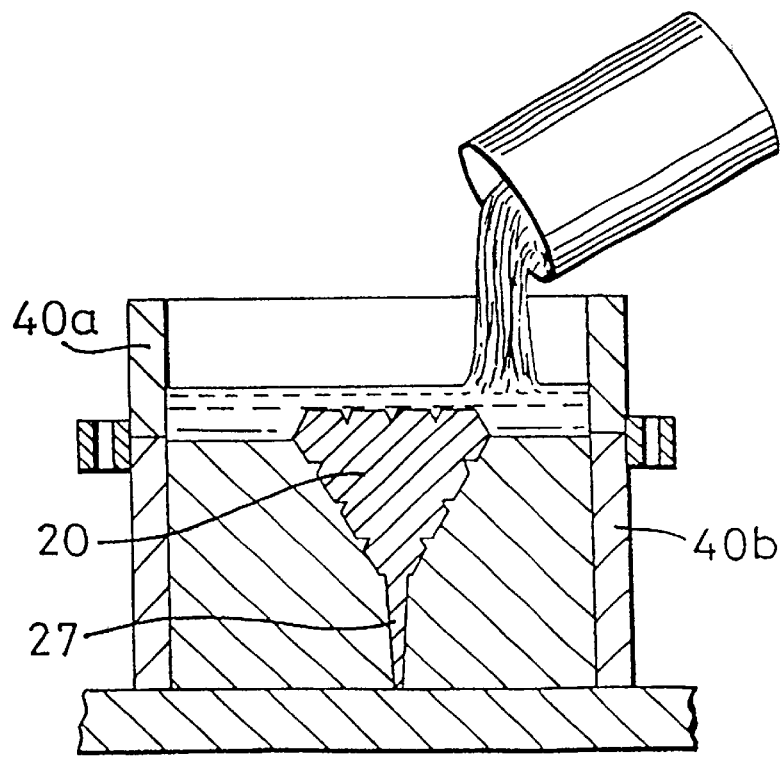
FIG. 4 is a schematic cross-sectional view depicting the second stage in mould building according to the process of the present invention.

Once cured, the next stage of mould preparation can be carried out, as illustrated schematically in FIG. 4. Lower bolster member 40b is inverted and the dry particulate material 25 is tipped out for re-use, if appropriate. To ensure that all traces of the dry particulate material 25 are removed from any crevices in the master pattern 20, the exposed surfaces may be brushed, blasted with compressed air, or cleaned by suction cleaning or any other suitable cleaning process; The upper bolster member 40a is then positioned in mating relationship with the lower bolster member 40b and fastened thereto by conventional means, such as by a plurality of flange bolts (not shown) inserted around the bolster periphery.

The second half of the pourable mould material is then poured into the space defined by the walls of the upper bolster member 40a. As before, the pourable mould material will have been pre-mixed with a curative that results in hardening to a solid flexible material. The assembled mould is then allowed to stand, for example for one hour at room temperature, until the second half of the mould material has cured.

In the next stage (not illustrated), the mould is separated and the master pattern 20 and the sprue pattern 27 are removed from the flexible mould material constrained by the lower bolster member 40b. After removal of the patterns 20, 27, the upper and lower bolster members 40a, 40b are reassembled to define a mould cavity (60, see FIG. 5) into which the material of choice can be injected to produce prototype mouldings for design evaluation.

Figure 5:
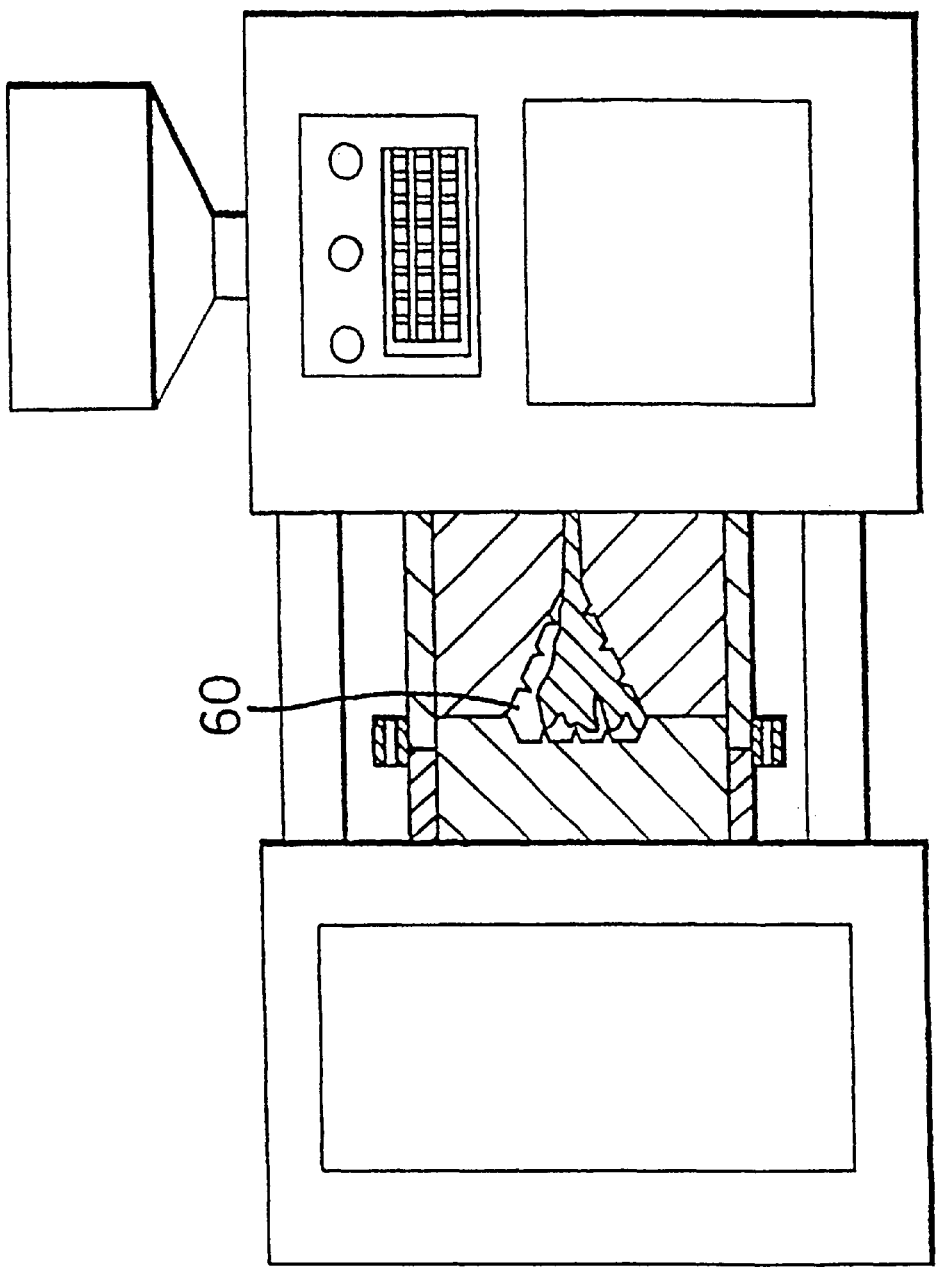
FIG. 5 is a schematic cross-sectional view showing the assembled mould in a production moulding machine.

FIG. 5 illustrates the assembled mould in position in a production moulding machine. Casting material is shown being injected into the mould cavity 60.

Although the invention has been particularly described above with reference to specific embodiments, it will be understood by persons skilled in the art that various modifications are possible without departing from the scope of the claims which follow.

What is claimed is:

1. A method of producing an article in a mould cavity formed by casting around a pattern of the article to be produced, the method comprising:
   (a) pouring a mould matrix material around said pattern in a mould bounded by solid retaining means;
   (b) causing said mould matrix material to harden to produce a solid flexible moulding medium having the following physical properties:
   flexural strength in the range 20–300 MPa;
   flexural modulus in the range 700–10,000 MPa;
   tensile strength in the range 16–200 MPa;
   tensile modulus in the range 850–10,000 MPa;
   compressive strength in the range 24–500 MPa;
   compressive modulus in the range 400–10,000 MPa;
   hardness in the range 5–100 Vickers; and
   specific gravity in the range 1–10, and (c) removing the pattern from the solid flexible moulding medium to leave a mould cavity conforming to the profile of the pattern;
   (d) forming or moulding an article in the mould cavity under production-representative conditions of temperature and pressure, and
   (e) removing the article from the mould cavity.

2. A method as claimed in claim 1 wherein the solid flexible moulding medium has a flexural strength in the range 30–100 MPa.

3. A method as claimed in claim 2 wherein the solid flexible moulding medium has a flexural strength of around 40 MPa.

4. A method as claimed in claim 1 wherein the solid flexible moulding medium has a flexural modulus in the range 1000 to 4000 MPa.

5. A method as claimed in claim 4 wherein the solid flexible moulding medium has a flexural modulus of around 1500 MPa.

6. A method as claimed in claim 1 wherein the solid flexible moulding medium has a tensile strength in the range 20–70 MPa.

7. A method as claimed in claim 6 wherein the solid flexible moulding medium has a tensile strength of around 22 MPa.

8. A method as claimed in claim 1, wherein the solid flexible moulding medium has a tensile modulus in the range 1000–4000 MPa.

9. A method as claimed in claim 8 wherein the solid flexible moulding medium has a tensile modulus of around 1300 MPa.

10. A method as claimed in claim 1, wherein the solid flexible moulding medium has a compressive strength in the range 30–120 MPa.

11. A method as claimed in claim 10, wherein the solid flexible moulding medium has a compressive strength of around 40 MPa.

12. A method as claimed in claim 1, wherein the solid flexible moulding medium has a compressive modulus in the range 600–2000 MPa.

13. A method as claimed in claim 12, wherein the solid flexible moulding medium has a compressive modulus of around 1000 MPa.

14. A method as claimed in claim 1, wherein the solid flexible moulding medium has a hardness in the range 7–80 Vickers.

15. A method as claimed in claim 14, wherein the solid flexible moulding medium has a hardness of around 9.5 Vickers.

16. A method as claimed in claim 1, wherein the solid flexible moulding medium has a specific gravity in the range 1.2–5.0.

17. A method as claimed in claim 16, wherein the solid flexible moulding medium has a specific gravity of around 1.3.

18. A method of producing an article as claimed in claim 1, wherein the mould matrix material is a curable resin.

19. A method of producing an article as claimed in claim 18, wherein the curable resin is urethane polymer cured by admixture with an isocyanate cross-linking agent.

20. A method of producing an article as claimed in claim 19, wherein the curable resin is a polyester-based polyurethane.

21. A method of producing an article as claimed in claim 1, wherein the mould matrix material is loaded with a variety of fillers or additives to adjust the properties of the hardened material.

22. A method of producing an article as claimed in claim 21, wherein the fillers or additives are included in an amount ranging from 30 to 70% in proportions by volume measured relative to the volume of mould matrix material.

23. A method of producing an article as claimed in claim 22, wherein the fillers or additives are included in an amount ranging from 40 to 60% in proportions by volume measured relative to the volume of mould matrix material.

24. A method of producing an article as claimed in claim 23, wherein the fillers or additives are included in an amount ranging from 45 to 55% in proportions by volume measured relative to the volume of mould matrix material.

25. A method of flash-free moulding an article in a mould cavity formed by casting around a pattern of the article to be moulded, the method comprising:

(a) pouring a mould matrix material around said pattern in a mould bounded by solid, inflexible retaining means;

(b) causing said mould matrix material to harden to produce a solid flexible moulding medium having the following physical properties:
flexural strength in the range 20–300 MPa;
flexural modulus in the range 700–10,000 MPa;
tensile strength in the range 16–200 MPa;
tensile modulus in the range 850–10,000 MPa;
compressive strength in the range 24–500 MPa;
compressive modulus in the range 400–10,000 MPa;
hardness in the range 5–100 Vickers; and
specific gravity in the range 1–10;

(c) removing the pattern from the solid flexible moulding medium to leave a mould cavity defined by mould halves separable at split lines, said mould cavity conforming to the profile of the pattern;

(d) injecting material into the mould cavity under predetermined conditions of temperature, and increasing the injection pressure such that the increase in pressure is transmitted into the body of the solid flexible moulding medium to increase the mating forces experienced between the mould halves at the split lines thereof, and (e) removing the moulded article from the mould cavity.

26. A method of producing a mould by forming around a pattern of an article to be produced, the method comprising:

(a) pouring a mould matrix material around said pattern in a chamber bounded by solid retaining means;

(b) causing said mould matrix material to harden to produce a solid flexible mould having the following physical properties:
flexural strength in the range 20–300 MPa;
flexural modulus in the range 700–10,000 MPa;
tensile strength in the range 16–200 MPa;
tensile modulus in the range 850–10,000 MPa;
compressive strength in the range 24–500 MPa;
compressive modulus in the range 400–10,000 MPa;
hardness in the range 5–100 Vickers; and
specific gravity in the range 1–10, and (c) removing the pattern to leave a mould conforming to the pattern.

27. A mould tool comprising a solid flexible mould having the following physical properties:
flexural strength in the range 20–300 MPa;
flexural modulus in the range 700–10,000 MPa;
tensile strength in the range 16–200 MPa;
tensile modulus in the range 850–10,000 MPa;
compressive strength in the range 24–500 MPa;
compressive modulus in the range 400–10,000 MPa;
hardness in the range 5–100 Vickers; and
specific gravity in the range 1–10.

* * * * *